US008069157B2

(12) United States Patent
Jam

(10) Patent No.: US 8,069,157 B2
(45) Date of Patent: Nov. 29, 2011

(54) SYSTEM AND METHOD FOR PROVIDING CONTEXT-AWARE COMPUTER MANAGEMENT USING SMART IDENTIFICATION BADGES

(75) Inventor: Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2659 days.

(21) Appl. No.: 09/836,952

(22) Filed: Apr. 17, 2001

(65) Prior Publication Data

US 2002/0152211 A1    Oct. 17, 2002

(51) Int. Cl.
*G06F 17/30* (2006.01)
(52) U.S. Cl. ......................................................... 707/705
(58) Field of Classification Search ............ 707/9, 104.1;
340/512.1, 573.1, 572.1, 7–21, 531, 10–52,
340/932.2, 5.2; 370/201, 370; 455/414.1,
455/456.2, 414, 403, 433, 435, 566; 709/225,
709/229, 217, 223; 713/185, 168, 166; 705/54,
705/64, 65, 80
See application file for complete search history.

(56) References Cited

U.S. PATENT DOCUMENTS

| | | | | |
|---|---|---|---|---|
| 5,204,663 | A | * | 4/1993 | Lee ............................... 340/5.28 |
| 5,611,050 | A | | 3/1997 | Theimer et al. |
| 5,629,981 | A | * | 5/1997 | Nerlikar ......................... 713/168 |
| 5,917,425 | A | * | 6/1999 | Crimmins et al. ........ 340/825.49 |
| 6,057,764 | A | * | 5/2000 | Williams .................... 340/572.1 |
| 6,351,813 | B1 | * | 2/2002 | Mooney et al. ............... 713/185 |
| 6,624,739 | B1 | * | 9/2003 | Stobbe ............................ 340/5.2 |
| 6,628,938 | B1 | * | 9/2003 | Rachabathuni et al. ...... 455/514 |
| 6,633,757 | B1 | * | 10/2003 | Hermann et al. .......... 455/414.1 |

OTHER PUBLICATIONS

Gallagher Jeo, Accessing the Campus, May 1, 1999, American School & University, pp. 1-4.*
General Services Administration, Smart Card Policy and Administrative Guidlines, Oct. 20, 2000, pp. 1-131.*
Ljungh Robert et al., WIPS Technical Documentation, May 25, 2000, Royal Institute of Technology, pp. 1-19.*
Dr. Maguire Jr. Gerald Q. et al., Smartbadges: a wearable computer communication system, 1998, Royal Institute of Technology, pp. 1-47.*
Ed Frauenheim—"Cyber Assistants"—TechWeek—Nov. 2000—pp. 28-29.
Ed Frauenheim—"Cyber Assistants"—Nov. 13, 2000—pp. 1-7.
Jennifer Hagendorf—"HP to Add Fingerprint ID"—Date Unknown—p. 1.
Mark T. Smith—"Smart Cards: Integrating for Portable Complexity"—Aug. 1998 _IEEE Computer Society—pp. 110-112 & 115.

* cited by examiner

*Primary Examiner* — Fred I Ehichioya

(57) ABSTRACT

A system and method for context-aware computer management is disclosed. The method of the present invention includes the steps of, assigning database information clearance levels; assigning smart badges one of the clearance levels; identifying smart badges having a lowest clearance level; and providing access to database information having clearance levels no higher than the lowest clearance level. The system of the present invention includes a database storing information differentiated by several clearance levels; a beacon; a set of smart badges, in visible communication with the beacon and assigned one of the clearance levels; a system service module, connected to the beacon, for identifying a lowest clearance level assigned to the smart badges; and a software application, connected to the service module and the database, for providing access to information within the database having clearance levels no higher than the lowest clearance level.

26 Claims, 3 Drawing Sheets

SYSTEM AND METHOD FOR PROVIDING CONTEXT-AWARE COMPUTER MANAGEMENT USING SMART IDENTIFICATION BADGES

BACKGROUND OF THE INVENTION

1. Field of the Invention

The present invention relates generally to systems and methods for context-aware computing, and more particularly for context-aware computer management using a smart badge.

2. Discussion of Background Art

Context-aware computing is a field of computer science where computers are provided with sensors for detecting their orientation with respect to persons, places or things. Smart identification badges are an example of context-aware computing devices which contain an array of mini-sensors and wireless technologies for gathering information on their environment and communicating with other computers in order to provide such services as unlocking doors, and selective access to sensitive database information within various secure environments.

The mini-sensors can use a variety of biometric and standard technologies to monitor environmental conditions such as light, humidity, temperature, and sound levels, as well as spatial motions, voice patterns, and perhaps pheromones. Software programs then process this sensor information to conclude such things as who is wearing a smart badge and for how long. Researchers in the area of context-aware computing include Dr. Mark Smith at Hewlett-Packard Labs in Palo Alto and Gerald Maguire, professor of data communications at the Swedish Royal Institute of Technology.

Dr. Smith, for example, has developed a badge size Secure-PAD which an employee picks up each morning, registers and authenticates in a secure booth, and carries on their person while at work. The badge communicates with beacons distributed throughout an office environment which respond to the badge by selectively opening doors and providing predetermined sets of information and functionality on secure computer systems. At the end of the day the badge is selectively inactivated. Presideo Inc., of Sebastian, Fla. also manufactures similar security systems as described on their web site at http://www.presideo.com.

FIG. 1 is a dataflow diagram of a prior art system 100 for interfacing with smart identification badges. In the system 100 credentials for several wearers are authenticated and downloaded into their respective smart badges 102, 104, 106, and 108. A computer 110 connected to a narrow infrared (IR) beacon 112 selectively communicates with the badges 102-108. The beacon 112 by design has a short distance and narrow visibility range so that only one smart badge worn by an employee sitting right in front of the computer 110 is visible to the beacon 112 at any one time. The prior art considers this narrow range of visibility as a way to increase the system's 100 overall security.

A system service module 114 within the computer 110 communicates 111 with the smart badges through the beacon 112. When a first one 104 of the smart badges 102-108 becomes visible to the beacon 112, the service 114 queries the badge 104 for a set of credentials and, if the credentials are authentic, instructs the computer 110, perhaps using Microsoft Corporation's Graphical Identification and Authentication (GINA) 116 and OS Logon 118 modules, to log the employee carrying the badge 104 on to the computer 110. If the badge 104 is no longer visible to the beacon 112, the service 114 the GINA 116 to lock the computer 110 and blank the computer display even though the employee remains logged on. Then, should the badge 104 become visible again, the service 114 instructs the GINA 116 to unlock the computer 110 and reactivate the computer display. If a second smart badge 106 becomes visible 120 to the computer 110, during a time when the first badge 104 is invisible to the beacon 112, the system service 114 instructs the GINA 116 to log-off the employee assigned to the first badge 104, and log-on the employee assigned to the second badge 106.

The system 100 is limited to allowing only one wearer to be logged on at any one time and requires that such wearer sit right in front of the computer 110 before unlocking the computer and display. Database security is thus achieved by logging only one wearer on a time. The wearer then runs a software application to access data in the database. The GINA's 116 role in controlling access to the database is by controlling which wearer logs on to the computer 110. In many operational settings, however, such an implementation is awkward to use. Furthermore, the prior art system 100 does not even begin to exploit the smart badge's 102-108 full capabilities for providing contextual information to the computer 110.

What is needed is a system and method for context-aware computer management using a smart badge that overcomes the problems of the prior art.

SUMMARY OF THE INVENTION

The present invention is a system and method for context-aware computer management. The method of the present invention includes the steps of: assigning database information one of several clearance levels; assigning each smart badge within a set of visible smart badges one of the clearance levels; identifying smart badges having a lowest clearance level; and providing access to database information having clearance levels no higher than the lowest clearance level.

In other aspects of the invention, the method may include the steps of: configuring a predetermined smart badge visibility range; updating the set of visible smart badges in response to a change in smart badge visibility status, and recalculating the lowest clearance level in response to the change in smart badge visibility status; recording the smart badge visibility status of each smart badge within an activity log; preventing database access to smart badge wearers when the wearer's smart badge visibility status is set to invisible longer than a predetermined timeout; reading and writing data items from and to the smart badges; defining a badge removal confidence level indicating whether each smart badge has been continuously worn by corresponding assigned smart badge wearers; assigning a smart badge time-to-live parameter to each of the smart badges; and inactivating a smart badge whose time-to-live parameter has been exceeded.

The system of the present invention includes a database storing information differentiated by a plurality of clearance levels; a wide-angle RF beacon; a set of smart badges, in communication with the beacon, each badge assigned one of the clearance levels; a system service module, connected to the beacon, for identifying a lowest clearance level assigned to the smart badges; and a software application, connected to the service module and the database, for providing access to information within the database having clearance levels no higher than the lowest clearance level.

In other aspects of the invention, the system may include a second diffuse IR beacon, coupled to the service module, for location awareness and perhaps limited to detecting smart badges within a workroom; the smart badges may also include biometric sensors for detecting when a smart badge has been removed from an assigned smart badge wearer.

The system and method of the present invention are particularly advantageous over the prior art because a customizable software application provides access to information based on clearance levels of those smart badge wearers visible to the beacons. Also, the wide angle first beacon enables the service module to monitor and communicate with all smart badges within a predefined area instead of just those smart badge wearers very close to or in front of the system.

These and other aspects of the invention will be recognized by those skilled in the art upon review of the detailed description, drawings, and claims set forth below.

DETAILED DESCRIPTION OF THE PREFERRED EMBODIMENT

Figure 1:
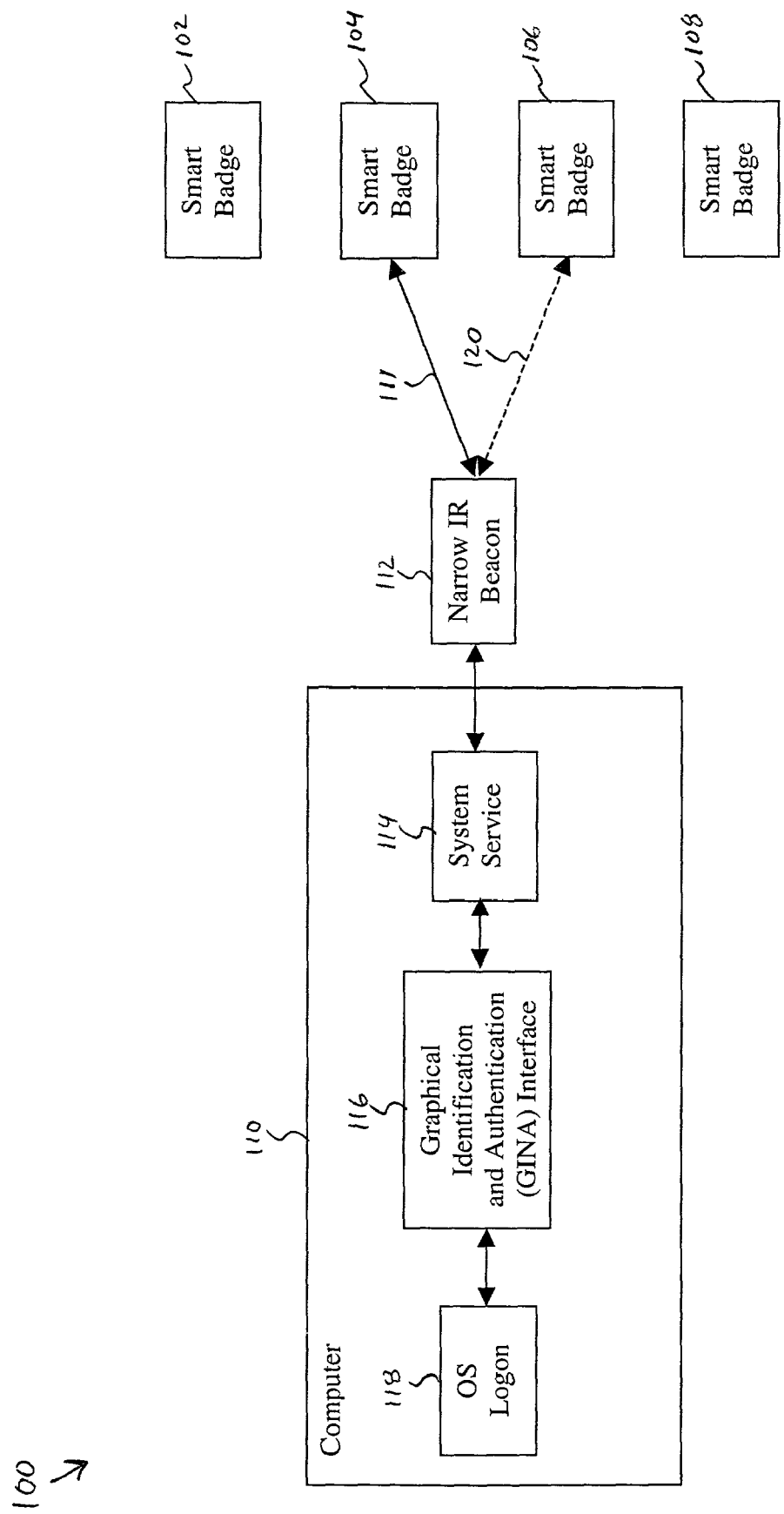
FIG. 1 is a dataflow diagram of a prior art system for interfacing with smart identification badges.
Figure 2:
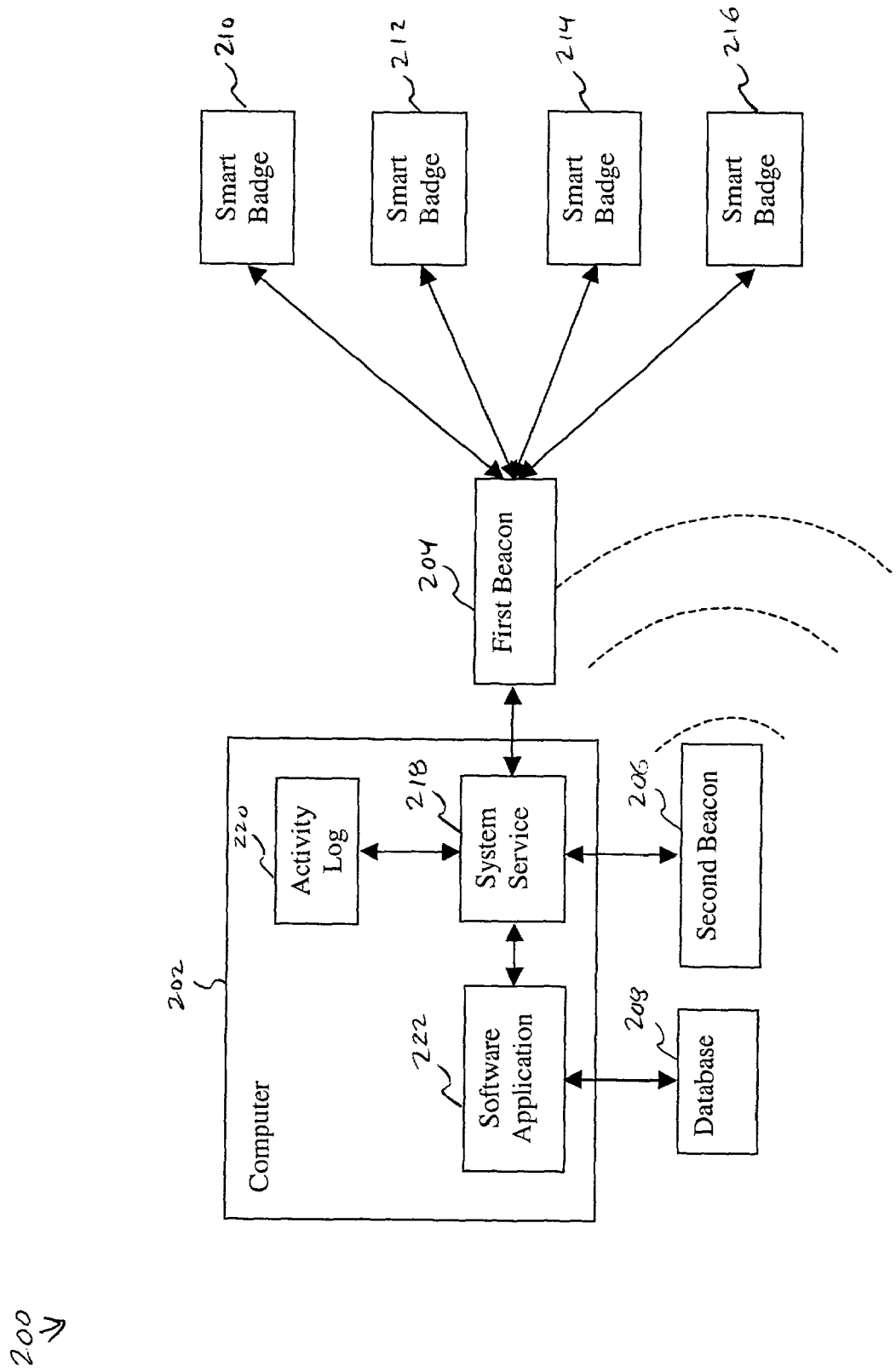
FIG. 2 is a dataflow diagram of an embodiment of a system for context-aware computer management using smart badges.

FIG. 2 is a dataflow diagram of an embodiment of a system 200 for context-aware computer management using smart badges. The system 200 includes a computer 202 coupled to a first wireless beacon 204, a second wireless beacon 206, and a database 208. The system 200 also includes one or more smart badges 210, 212, 214, and 216 in communication with the computer 202 through the beacons 204, 206. The computer 202 may or may not be networked with other computers in a client/server topology.

The smart badges 210-216 are context-aware devices which improve upon a design developed by Dr. Mark Smith at Hewlett-Packard Labs in Palo Alto called SecurePad. The badges communicate with the beacons 204, 206 using either Radio Frequency (RF) and/or Infrared (IR) technology. The badges contain various biometric and other sensors for detecting and monitoring the badges' surroundings, including those persons wearing and/or objects affixed to the badges. While the following specification discusses an embodiment of the present invention where the badges are worn by people in a workroom, those skilled in the art will recognize that the present invention in other embodiments can be used in a variety of other applications.

The smart badges are preferably activated, and initialized within a standard security booth. Within the booth a smart badge wearer follows a traditional security protocol (i.e. such as typing a password on keyboard, or displaying a finger print) to activate and initialize a badge. As part of initialization all smart badge credentials are reset, previously stored data is erased, and a new set of data may be downloaded into a data storage area within the smart badge.

The first beacon 204 includes a transmitter and a receiver for establishing a communications link between the computer 202 and the smart badges 210-216. The first beacon 204 is preferably a wide angle device which can simultaneously detect and communicate with several smart badges. The first beacon 204 preferably communicates with the smart badges using an RF signal. RF signals can pass through walls, doors, file cabinets and other blocking objects and thus provides a more reliable communications link than IR. The second beacon 206 is preferably a diffuse IR device which works in conjunction with an RF first beacon 202. Since walls, doors, window, and etc. block IR signals, the second beacon 206 helps the computer 202 distinguish between smart badges within the workroom and smart badges passing by in a hallway outside of the workroom.

The database 208 preferably stores information having a plurality of confidentiality levels. Each smart badge wearer may have one of several different clearance levels assigned to their smart badge during the activation and initialization procedure. For example, if the information includes confidential patient medical records within a hospital setting, a first smart badge wearer, who is a doctor, may have a clearance level permitting accessibility to a first set of records and/or fields in the database 208, while a second smart badge wearer, who is a nurse, may have a clearance level permitting accessibility to a second set of records and/or fields in the database 208, which may or may not overlap with the first set of records and fields. Those skilled in the art recognize that the information in the database 208 could alternatively be business records in a corporate setting, financial records at a bank, or any other type of information.

While the entire system 200 is preferably located within the workroom, only some sort of user interface (e.g. a display terminal and a keyboard) and the second beacon 206 need to be located within the workroom.

Within the computer 202 there is a system service module 218, an activity log 220, and a software application module 222. The computer 202 is initially and preferably booted up by a trusted system administrator, after which the system service 218 is automatically activated as a background process. The system administrator then logs on to the computer 202 using standard logon procedures. Once logged on, the administrator launches the software application 222.

The service module 218 is coupled to the first beacon 204, the second beacon 206, the activity log 220 and the software application 222. Software within the service module 218 normally operates as an ongoing background process responsive to entry and exit of smart badges from the workroom. Those skilled in the are will recognize that while the system service 218 is described with reference to a Microsoft Corporation Windows NT environments consisting of background services, functionality within the system service 218 module could easily be implemented by demons within a UNIX environment, or in another application program. Throughout operation, the service module 218 continually records and updates a variety of context-aware information in the activity log 220 regarding the smart badges 210-216, their status, and configuration.

The application 222 provides database 208 access to only a predetermined set of smart badge wearers. The application 222 also includes database management code for selectively retrieving and displaying sets of records and/or fields within the database 208 corresponding to the clearance level of each smart badge wearer within the workroom. The application 222 also may provide differing levels of software application functionality based on the clearance levels. Thus, the application provides data access security by cooperating with the system service 218 and consulting the activity log 220 for a list of wearers present within the workroom and their corresponding clearance levels. Preferably, the wearers are not actually logged on and off of the computer 202, but rather are either provided or denied access to the database 208 and functionality on the computer 202.

Returning to the hospital setting example, when the doctor is in the workroom, the application 222 permits retrieval and display of the first set of records and fields, however, should the nurse enter the workroom, the application 222 preferably permits retrieval and display of those records and fields which are common to the first and second sets of records and fields. Later, should a receptionist enter the workroom who does not have clearance to see any of the records or fields, the application 222 may deny access to all records and fields, and blank the computer display, even though the doctor and nurse are still in the workroom. Those skilled in the art will recognize that when information is or is not retrievable and displayed depends upon each implementation of the software application 222.

Figure 3:
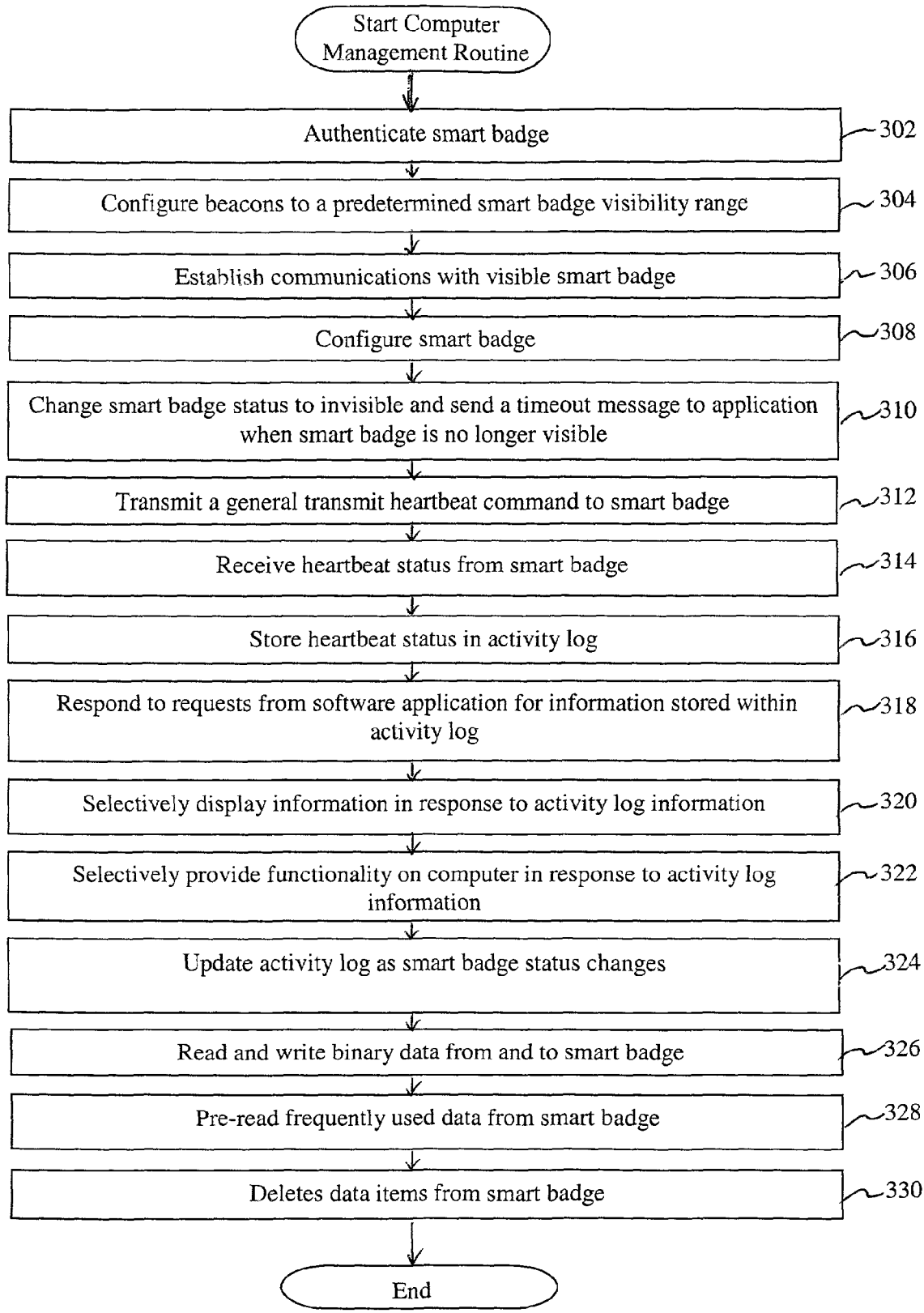
FIG. 3 is a flowchart of an embodiment of a method for context-aware computer management using smart badges.

FIG. 3 is a flowchart of an embodiment of a method for context-aware computer management using smart badges. A computer-usable medium embodying computer program code for the context-aware computer management is provided. The method begins in step 302 where wearers enter a secure booth and authenticate their smart badge. During authentication, the smart badge is reset to an initial state. Resetting the badge erases all prior credentials and stored data.

In step 304, the service module 218 configures the beacons 204, 206 to a predetermined smart badge field of visibility. While preferably, smart badge visibility is defined as those smart badges which are in communication with both beacons 204 and 206, smart badge visibility range can also be adjusted by limiting transmitter power or receiver sensitivity of the smart badges 210-216, the first beacon 204, and/or the second beacon 206. In this latter, less favored implementation, first, the first and second beacons' 204, 206 transmitter output and the receiver sensitivity of the smart badges 210-216 are all set at their maximum to ensure that the computer 202 can send commands to the smart badges 210-216. Then smart badge visibility is limited through predetermined adjustments to the beacons' 204, 206 reception sensitivity and/or the smart badges' 210-216 transmitter power.

In step 306, the service module 218 establishes communications with all visible smart badges. As discussed before, the smart badges 210-216 which are visible are preferably all located somewhere within the workroom.

Next in step 308, the service module 218 configures each of the visible smart badges. As part of configuration, the service module 218 defines a VisibleTimeout variable which specifies a predetermined period of time during which one or more of the smart badges can be invisible to (i.e. out of communication with) one or more of the beacons 204, 206.

The service module 218 can also set a variety of other smart badge variables, such as a TimeToLive variable, a LostBadgeTimeout variable, as well as internal clock and calendar variables. The TimeToLive variable sets an expiration period for the smart badge, which upon expiration, the smart badge automatically de-authenticates itself and erases all internally stored data. Preferably, the TimeToLive variable is set to a little longer than a standard work day.

The LostBadgeTimeout variable, specifies a time before the smart badge sounds an audible alarm, such as a beep, once the biometric sensors in the smart badge determine that the badge is no longer on the wearer. Preferably the LostBadgeTimeout variable is set to one hour.

In step 310, when a smart badge is no longer visible the service module 218 changes that smart badge's status to invisible in the activity log 220 and sends a smart badge timeout message to the application 222. The VisibleTimeout variable permits badge wearers to walk throughout the workroom and be invisible for a predetermined period of time without being identified within the activity log 220 as invisible. Preferably the VisibleTimeout predetermined period of time is set to five seconds.

In step 312, every 500 msec or so the service module 218 sends out a general transmit heartbeat command to all smart badges within the workroom. In response, each smart badge transmits a heartbeat status message to the service module 218, which is received by the service module 218 in step 314.

The heartbeat status message includes a predetermined set of badge status information, such as: smart badge identification (ID) number; badge removal confidence; badge removed; time-to-live; reset state; activation state; initialization state; badge activated; badge initialized; ID card on badge; ID card removed at least once; and battery state of charge. Note, the ID card is preferably a standard employee site badge. During authentication, wearers are required to insert their ID card in a slot on top of their smart badge. A sensor on the smart badge detects whether the ID card remains in the slot. Those skilled in the art will recognize that many other codes may also be included in the heartbeat.

The smart badge ID number is unique and permanently stored within each smart badge. The badge removal confidence is a variable which indicates a confidence level that the smart badge has been continuously worn by the smart badge wearer. Badge removal confidence is programmed by the smart badge's biometric sensors to between "0 to 7," where "0" indicates with certainty that the badge was worn at all times by the wearer, and "7" indicates with certainty that at some time the badge was worn by a different wearer.

In step 316, the service module 218 stores each smart badge's heartbeat status and status changes in the activity log 220. Smart badge status changes include smart badge wearer enters the workroom, smart badge wearer leaves the workroom, and heartbeat status changes.

In step 318, the service module 218 responds to requests from the software application 222 for information stored within the activity log 220. In step 320, the software application 222 selectively displays information on the computer display in response to the activity log information and the application's 222 programming. In step 322, the software application 222 also selectively provides functionality on the computer 202 in response to the activity log information and the application's 222 programming. In step 324, the service module 218 updates the activity log 220 as smart badge status changes.

In step 326, the service module 218 read and/or writes binary data from/to the smart badge in response to commands from the application 222. Data items may include security passwords/cookies and/or other wearer specific personalized data. The data is preferably password protected and communication between the service module 218 and the smart badge can be either synchronous or asynchronous. Asynchronous data transfer tolerates a momentary loss of smart badge visibility during data transfer, such as when wearer moves about the workroom.

In step 328, the service module 218 periodically pre-reads a predetermined set of frequently used data from the smart badges. Pre-reading is defined as when the service module 218 reads data items from the smart badge during otherwise idle times when the badge is visible to the beacon 204, but no communications between the service module 218 and the badge are otherwise required. The pre-read function enables the software application 222 to be more responsive.

In step 330, the service module 218 selectively deletes data items from the smart badge in response to application 222 commands.

While one or more embodiments of the present invention have been described, those skilled in the art will recognize that various modifications may be made. Variations upon and modifications to these embodiments are provided by the present invention, which is limited only by the following claims.

What is claimed is:

1. A computer-implemented method comprising:
assigning information stored on a computer a plurality of clearance levels;
assigning each smart badge within a set of smart badges a corresponding one of the clearance levels;
using a wireless beacon to detect which smart badges are located within a predefined boundary;
identifying a lowest clearance level from among the clearance levels assigned to the smart badges within the boundary; and
providing access to that sub-set of the information having a clearance level no higher than the lowest identified clearance level.

2. The method of claim 1 further comprising:
defining those smart badges within the boundary as a set of visible smart badges; and
updating the set of visible smart badges in response to a change in smart badge visibility status.

3. The method of claim 2 further comprising:
recalculating the lowest clearance level in response to the change in smart badge visibility status.

4. The method of claim 2 further comprising:
recording the smart badge visibility status of each smart badge within an activity log.

5. The method of claim 2 further comprising:
preventing access to the information when the smart badge visibility status is set to invisible for a predetermined timeout.

6. The method of claim 1 wherein providing includes:
providing access to smart badge wearers assigned to the smart badges.

7. The method of claim 1 further comprising:
writing data items to the smart badges.

8. The method of claim 7 further comprising:
pre-reading the data items from the smart badges during idle periods.

9. The method of claim 1 further comprising
defining a badge removal confidence level indicating whether each smart badge has been continuously worn by corresponding assigned smart badge wearers.

10. The method of claim 1 further comprising:
assigning an expiration period to each of the smart badges; and
de-authenticating and erasing all data stored on a smart badge whose expiration period has been exceeded.

11. The method of claim 1 wherein the using element includes:
configuring the predefined boundary by varying a sensitivity level of the wireless beacon.

12. The method of claim 1, wherein providing access to the sub-set of information comprises providing access to the sub-set of information stored on the computer located within the predefined boundary.

13. The method of claim 1, wherein the wireless beacon comprises a first wireless beacon to communicate with the smart badges, the method further comprising:
using a second wireless beacon to communicate with the smart badges,
wherein detecting which smart badges are located within the predefined boundary is based on the first and second wireless beacons.

14. The method of claim 13, wherein using the second wireless beacon comprises using the second wireless beacon to communicate with smart badges within the predefined boundary and to communicate with smart badges outside the predefined boundary through one or more blocking objects defining the predefined boundary, and
using the first wireless beacon comprises using the first wireless beacon to communicate with smart badges within the predefined boundary, wherein the first wireless beacon is blocked from communicating with smart badges outside the predefined boundary by the one or more blocking objects.

15. The method of claim 14, wherein using the first wireless beacon comprises using an infrared beacon, and wherein using the second wireless beacon comprises using a radio frequency beacon.

16. A method for context-aware computer management comprising:
assigning database information a plurality of clearance levels;
assigning each smart badge within a set of smart badges a corresponding one of the clearance levels;
using a wireless beacon to detect which smart badges are located within a predefined physical boundary;
identifying a lowest clearance level from among the clearance levels assigned to the smart badges within the boundary;
providing access to that sub-set of the database information having a clearance level no higher than the lowest identified clearance level on a computer located within the predefined physical boundary;
defining those smart badges within the boundary as a set of visible smart badges;
updating the set of visible smart badges in response to a change in smart badge visibility status; and
recalculating the lowest clearance level in response to the change in smart badge visibility status.

17. A system for context-aware computer management comprising:
means for assigning database information a plurality of clearance levels;
means for assigning each smart badge within a set of smart badges a corresponding one of the clearance levels;
means for using a wireless beacon to detect which smart badges are located within a predefined physical boundary;
means for identifying a lowest clearance level from among the clearance levels assigned to the smart badges within the boundary;
means for providing access to that sub-set of the database information having a clearance level no higher than the lowest identified clearance level on a computer located within the predefined physical boundary;
means for defining those smart badges within the boundary as a set of visible smart badges;
means for updating the set of visible smart badges in response to a change in smart badge visibility status; and
means for recalculating the lowest clearance level in response to the change in smart badge visibility status.

18. A system for context-aware computer management comprising:
a database, including information differentiated by a plurality of clearance levels;
a first wireless beacon;
a set of smart badges, detected by the first wireless beacon to be within a predefined boundary, each badge assigned a corresponding one of the clearance levels;
a computer located within the boundary;

a system service module, coupled to the first wireless beacon, for identifying a lowest clearance level from among the clearance levels assigned to the smart badges within the boundary; and a software application, coupled to the system service module and the database, for providing access to that sub-set of the information within the database having a clearance level no higher than the lowest identified clearance level on the computer.

19. The system of claim 18, wherein the first beacon includes:

a wide angle RF beacon.

20. The system of claim 18, further comprising:

a second diffuse IR beacon, coupled to the service module, limited to detecting smart badges within the predefined boundary.

21. The system of claim 18, wherein the smart badges include:

biometric sensors for detecting when a smart badge has been removed from an assigned smart badge wearer.

22. The system of claim 18, wherein the service module defines those smart badges within the boundary as a set of visible smart badges, and recalculates the lowest clearance level in response to a change in a visibility status.

23. The system of claim 18, wherein the application logs smart badge wearers assigned to visible smart badges onto the computer.

24. A system comprising:

storage to store sub-sets of information associated with corresponding plural clearance levels;

a first wireless beacon to communicate wirelessly with badges within a predefined region, each of the badges associated with one of the plural clearance levels;

a module to identify a lowest clearance level from among the clearance levels of the badges within the predefined region; and software to provide access to one or more sub-sets of information in the storage having one or more clearance levels no higher than the identified lowest clearance level.

25. The system of claim 24, further comprising:

a second wireless beacon to communicate wirelessly with badges within the predefined region and at least one badge outside the predefined region, wherein the first wireless beacon is unable to communicate with the at least one badge outside the predefined region, the module to detect the badges that are within the predefined region based on the first and second wireless beacons.

26. The system of claim 25, wherein the second wireless beacon comprises a radio frequency beacon, and the first wireless beacon comprises an infrared beacon.

* * * * *